US011984288B2

(12) United States Patent
Johansson

(10) Patent No.: US 11,984,288 B2
(45) Date of Patent: May 14, 2024

(54) DRIVE ARRANGEMENT FOR A TAP CHANGER

(71) Applicant: Hitachi Energy Ltd, Zürich (CH)

(72) Inventor: Martin Johansson, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 227 days.

(21) Appl. No.: 17/623,916

(22) PCT Filed: Jun. 22, 2020

(86) PCT No.: PCT/EP2020/067292
§ 371 (c)(1),
(2) Date: Dec. 30, 2021

(87) PCT Pub. No.: WO2021/001188
PCT Pub. Date: Jan. 7, 2021

(65) Prior Publication Data

US 2022/0415586 A1 Dec. 29, 2022

(30) Foreign Application Priority Data

Jul. 1, 2019 (EP) .................................... 19183692

(51) Int. Cl.
*H01H 9/00* (2006.01)

(52) U.S. Cl.
CPC ........ *H01H 9/0027* (2013.01); *H01H 9/0016* (2013.01)

(58) Field of Classification Search
CPC .......................... H01H 9/0027; H01H 9/0016
See application file for complete search history.

(56) References Cited

U.S. PATENT DOCUMENTS 3,798,395 A * 3/1974 Norman .................. H01H 3/30 200/18
3,833,096 A * 9/1974 Norman .................. F16D 65/18 188/166

(Continued)

FOREIGN PATENT DOCUMENTS

CN 103310962 A 9/2013
CN 104704588 A 6/2015

(Continued)

OTHER PUBLICATIONS

International Search Report and Written Opinion of the International Searching Authority, PCT/EP2020/067292, dated Sep. 10, 2020, 15 pages.

(Continued)

*Primary Examiner* — Kyung S Lee
(74) *Attorney, Agent, or Firm* — Sage Patent Group

(57) ABSTRACT

A drive arrangement for a tap changer includes a first movable latch having a first and a second end a first rotatable wheel with a first actuating element, a second rotatable wheel with a first locking element, and a first spring connected between the first and second wheels. The first actuating element is provided on a first half of a first curved surface of the first wheel, the first locking element is provided on a first half of a second curved surface of the second wheel, a second actuating element is provided on a second half of the first curved surface aligned with a first end of a second latch and a second locking element of the second rotating wheel is provided on a second half of the second curved surface aligned with a second end of the second latch.

20 Claims, 5 Drawing Sheets

(56) References Cited

U.S. PATENT DOCUMENTS

| | | | | |
|---|---|---|---|---|
| 7,942,073 | B2 | 5/2011 | Jonsson | |
| 8,748,758 | B2 * | 6/2014 | Hoepfl | H01H 3/3052 200/11 J |
| 9,251,971 | B2 * | 2/2016 | Albrecht | H01H 3/44 |
| 10,192,693 | B2 | 1/2019 | Herold et al. | |
| 10,643,802 | B2 * | 5/2020 | Hammer | H01H 9/0016 |

FOREIGN PATENT DOCUMENTS

| | | | |
|---|---|---|---|
| CN | 107077986 | A | 8/2017 |
| CN | 107438889 | A | 12/2017 |
| DE | 850181 | C | 9/1952 |
| FR | 1373462 | A | 9/1964 |
| KR | 20080082626 | A | 9/2008 |
| WO | 2013174567 | A1 | 11/2013 |

OTHER PUBLICATIONS

Extended European Search Report dated Dec. 11, 2019 for European Patent Application No. 19183692.3, 10 pages.
First Office Action for Chinese Patent Application No. 2020800485716, dated Aug. 25, 2023, 7 pages.
Korean Office Action dated Oct. 24, 2023 for Korean Patent Application No. 10-2021-07042646, 15 pages (including English translation).

* cited by examiner

DRIVE ARRANGEMENT FOR A TAP CHANGER

CROSS REFERENCE TO RELATED APPLICATIONS

This application is a 35 U.S.C. § 371 national stage application of PCT International Application No. PCT/EP2020/067292 filed on Jun. 22, 2020, which in turns claims foreign priority to European Patent Application No. 19183692.3, filed on Jul. 1, 2019, the disclosures and content of which are incorporated by reference herein in their entirety.

FIELD

The present disclosure relates to a drive arrangement for a tap changer as well as to a method of operating such a drive arrangement.

BACKGROUND

Tap changers are used in transformers in order to change the ratio between the number of windings on the primary and secondary side. Such a tap changer also includes a so-called diverter switch.

In order to make such a change the transformer is typically equipped with a drive mechanism for carrying out a tap change, i.e. a change of the winding ratio. This drive mechanism is used with the diverter switch of the tap changer.

However, it would be of interest to simplify the drive mechanism.

SUMMARY

The present disclosure is thus directed towards providing a simpler drive mechanism.

This object is according to a first aspect of the present disclosure achieved through a drive arrangement for a tap changer, the drive arrangement comprising a first movable latch having a first and a second end, a first rotatable wheel with a first actuating element for engaging the first end of the first movable latch, a second rotatable wheel with a first locking element for engaging with the second end of the first movable latch, and a first spring connected between the first and second wheels for storing energy caused by the movement of the first wheel around a first axis and apply it in the movement of the second wheel around a second axis.

The spring may be connected between a first connection point on the first wheel radially distanced from the first axis and a second connection point on the second wheel radially distanced from the second axis.

The first connection point may be provided on a first planar surface of the first wheel that is perpendicular to the first axis and the second connection point may be provided on a first planar surface of the second wheel that is perpendicular to the second axis. The first surfaces of the first and second wheels may additionally be aligned with each other, They may be placed in the same plane.

The first latch may be pivotable around a tap point, which tap point may be placed in a center area of the first latch located between the first and second ends.

The first actuating element may be provided on a first curved surface of the first wheel. It may additionally be aligned, in a direction along the first axis, with the first end of the first latch. The first locking element may be provided on a curved surface of the second wheel and may in turn be aligned, in a direction along the second axis. with the second end of the first latch.

It is possible that in one initial position of the second wheel, the second end of the first movable latch is engaged with the first locking element of the second rotatable wheel for stopping rotation thereof and that the first rotatable wheel being driven around the first axis causes energy to be stored in the spring and subsequently causes the first actuating element to engage with the first end of the first latch for disengaging the second end of the first latch from the first locking element of the second rotatable wheel thereby causing the second wheel to rotate round the second axis powered by the release of the energy of the spring.

The drive arrangement may additionally comprise a second movable latch having a first and a second end. In this case the first rotatable wheel may have a second actuating element for engaging with the first end of the second movable latch and the second rotatable wheel may have a second locking element for engaging with the second end of the second movable latch.

The first actuating element may be provided on a first half of the curved surface of the first wheel. The first locking element may be provided on a first half of the curved surface of the second wheel. The second actuating element may be provided on a second half of the curved surface of the first wheel aligned, in a direction along the first axis, with the first end of the second latch and the second locking element of the second rotating wheel may be provided on a second half of the curved surface of the second wheel, in a direction along the second axis, aligned with the second end of the second latch.

The second locking element of the second wheel may be configured to engage with the second end of the second latch through the movement of the second wheel, thereby locking the second wheel in a further position.

Each actuation element and each locking element may be realized as a protrusion on the corresponding curved surface. The first end of each latch may be formed as a curvature interacting with a corresponding actuating element formed as a curved protrusion. The second end of each latch may be equipped with a planar surface configured to engage a planar surface of the corresponding locking element.

The first and second actuating elements may be separated by a first angle in relation to the first axis, such as an angle of 180 degrees. The first and second locking elements may in turn be separated by a second angle in relation to the second axis, such as an angle of 180 degrees.

The rotation of the first wheel may be bidirectional and the rotation of the second wheel may be unidirectional. The first wheel may be connected to a diverter switch of the tap changer and the second wheel may be connected to at least one further switch of the tap changer.

A second aspect is concerned with a method for operating a drive mechanism according to the first aspect comprising: driving the first rotatable wheel around the first axis when the second end of the first movable latch is engaged with the first locking element of the second rotatable wheel for stopping rotation thereof, thereby causing energy to be stored in the spring and subsequently engaging the first actuating element with the first end of the first latch for moving the latch, thereby disengaging the second end of the first latch from the first locking element of the second rotatable wheel and rotating the second wheel powered by the release of the energy of the spring.

The method may further comprise engaging the second locking element of the second wheel with the second end of the second latch through the movement of the second wheel, thereby locking the second wheel in a second position.

Embodiments disclosed herein have a number of advantages. It provides a simpler diverter switch design. It also reduces the complexity of the design and allows the integration of several functions with a limited number of parts.

BRIEF DESCRIPTION OF THE DRAWINGS

The present disclosure will in the following be described with reference being made to the accompanying drawings, where FIG. 1 schematically shows a tap changer and one winding of a transformer for which the number of turns are changed using the tap changer.

DETAILED DESCRIPTION

In the following, a detailed description of embodiments of the disclosure will be given.

Transformers are used in a number of applications such as when transforming between various voltages and current levels.

A transformer typically comprises one or more primary windings and one or more secondary windings. It is furthermore possible that a winding is connected to a tap changer.

Figure 1:
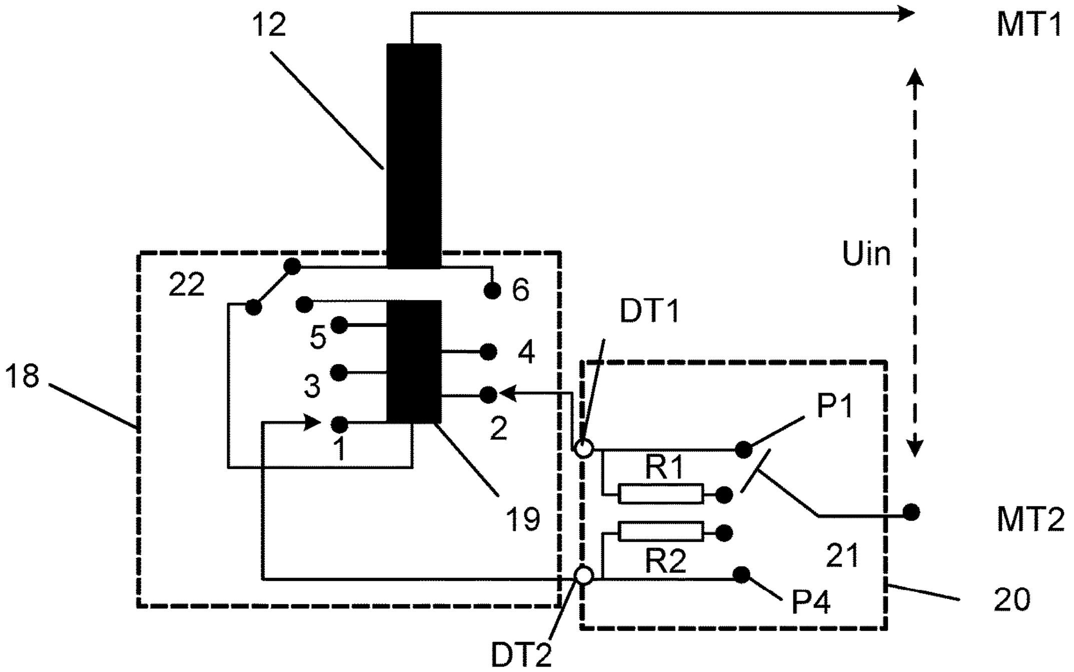

FIG. 1 schematically shows a first winding 12 of a transformer together with a tap changer that comprises a regulating winding 19. The first winding 12 has a first and a second end, with the first end connected to a first connection terminal MT1 and the second end connectable to the regulating winding 19. The regulating winding 19 also has a first and a second end. The tap changer furthermore comprises a diverter 20 and a selector 18 that selects a number of turns of the regulating winding 19 that are to be connected to the first winding 12.

The selector 18 has a selector switch 22 that is used to reverse the orientation of the regulating winding 19 and therefore has a first end connected to the second end of the first winding 12 and a second end moveable between two positions, a first position at the first end of the regulating winding 19 and a second position at the second end of the regulating winding 19. Each winding 12 and 19 comprises a number of turns of electrical conductor. Furthermore, the regulating winding 19 comprises a number of tap points of which six 1, 2, 3, 4, 5 and 6 are shown as an example. The tap points are used for determining how many turns of the regulating winding 19 that are to be connected to the first winding 12 by a first selector arm connected to a first diverter terminal DT1 and a second selector arm connected to a second diverter terminal DT2.

The diverter 20 in turn comprises a diverter switch 21 with a first end connected to a second connection terminal MT2 and a second end that is connectable between four contact positions, where a first contact position P1 leads to the first diverter terminal DT1 via a first diverter arm, a second contact position leads to the first diverter terminal DT1 via an impedance element in the form of a first resistor R1, a third contact position leads to the second diverter terminal DT2 via an impedance element in the form of a second resistor R2 and a fourth contact position P4 leads directly to the second diverter terminal DT2 via a second diverter arm. The diverter 20 is provided for commutating a load between the two selector arms.

It should here be realized that this is merely one realization of a selector and diverter tap changer. There exist several other types of selector and diverter tap changers. There also exist other types of tap changers. The shown tap changer also comprises resistors as impedance element. However, it is also known to use other types of impedance elements, such as inductors. Furthermore, in the shown tap changer there are two impedance elements. It should be realized that it is also possible with fewer, such as one, or even more, such as three or four.

In order to move a switch such as diverter switch, the tap changer is equipped with a drive arrangement.

Figure 2:
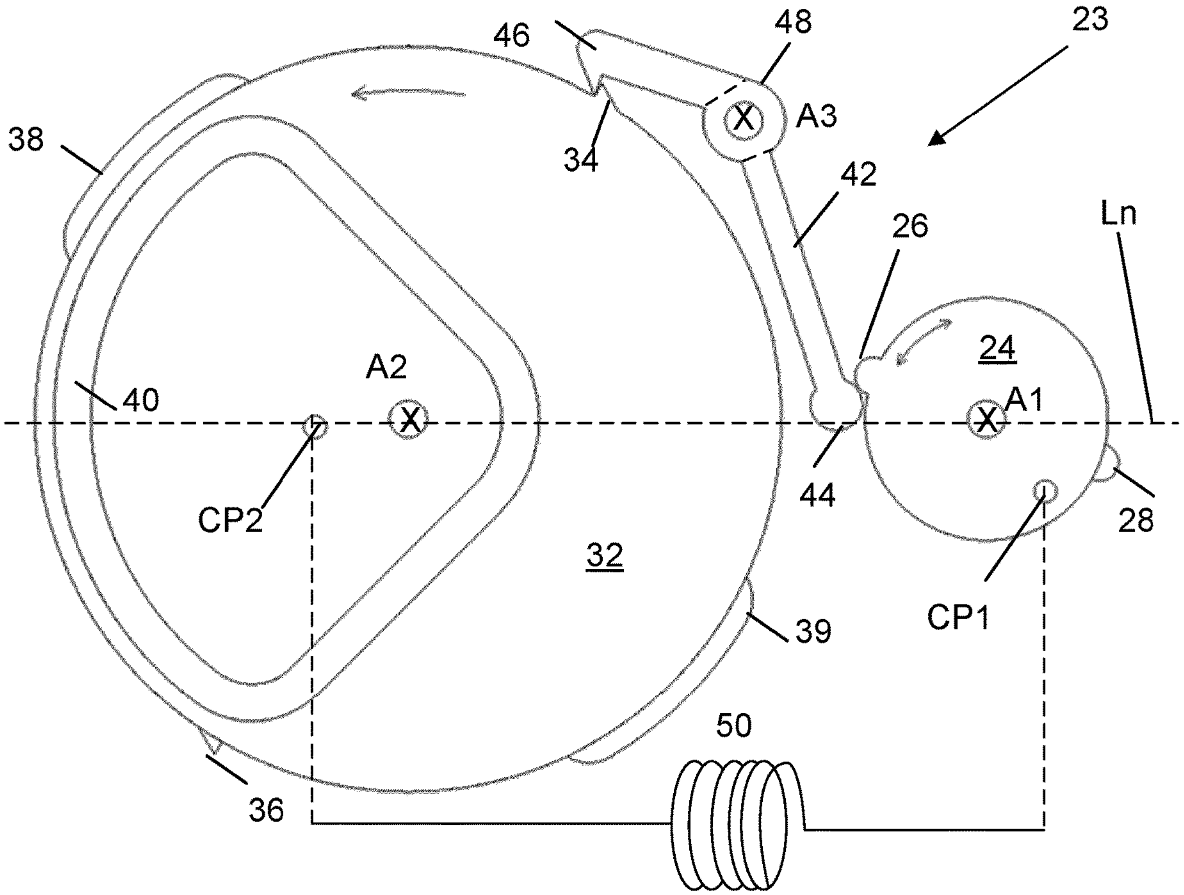
FIG. 2 shows a plan view of a first side of a drive arrangement for a tap changer comprising a first and second wheel together with a first latch and a schematically shown spring.
Figure 3:
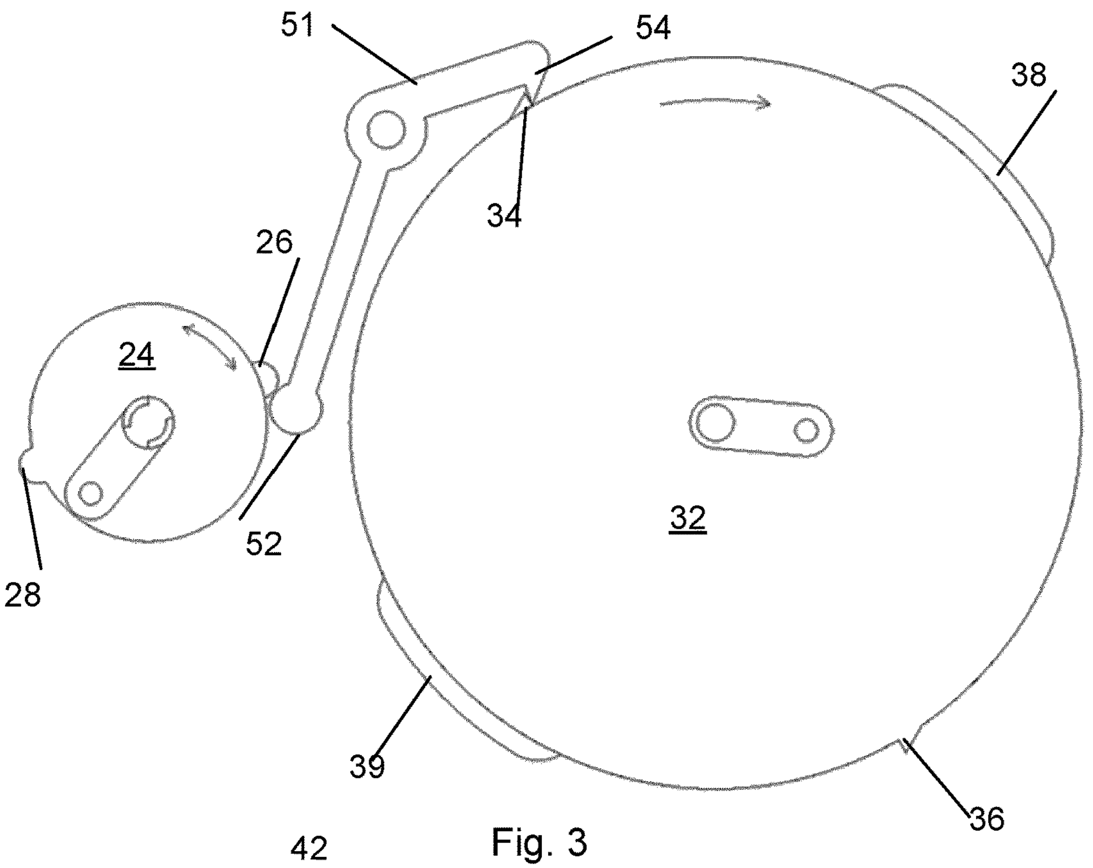
FIG. 3 shows a plan view of a second side of the drive arrangement comprising the first and second wheel together with a second latch.
Figure 4:
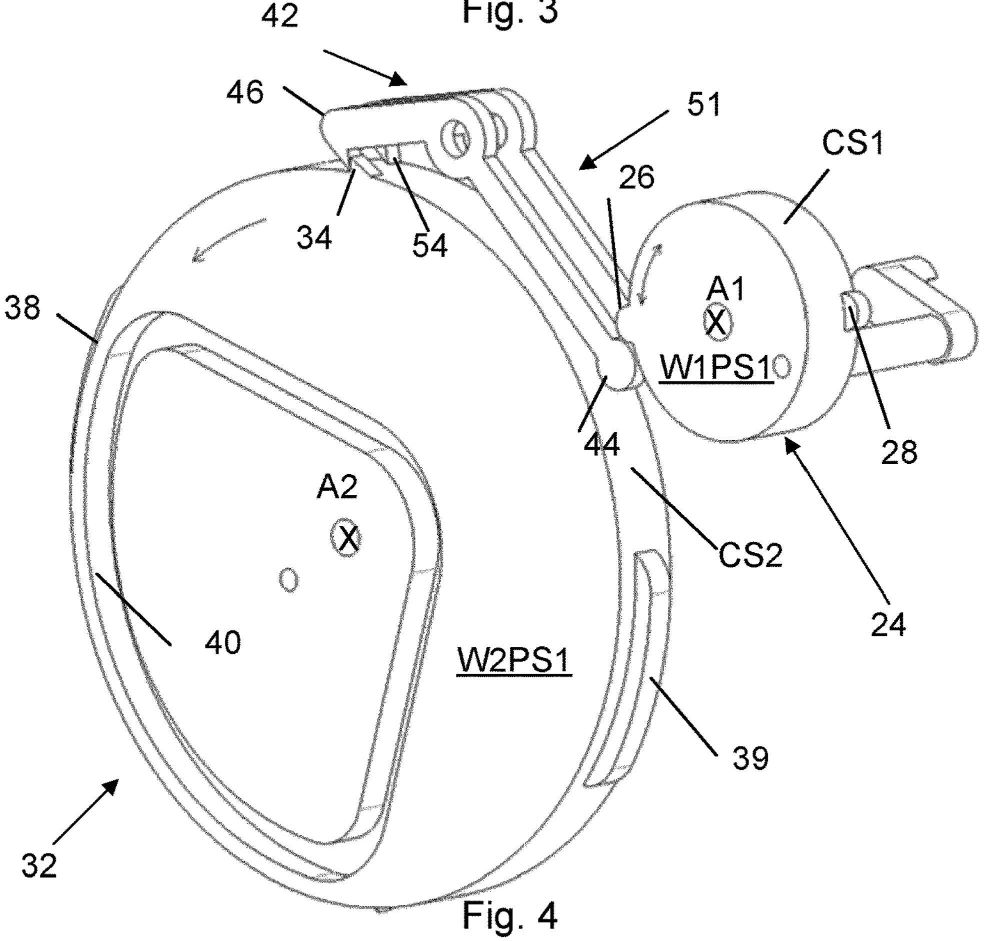
FIG. 4 shows a perspective view of the first side of the drive arrangement without the spring.
Figure 5:
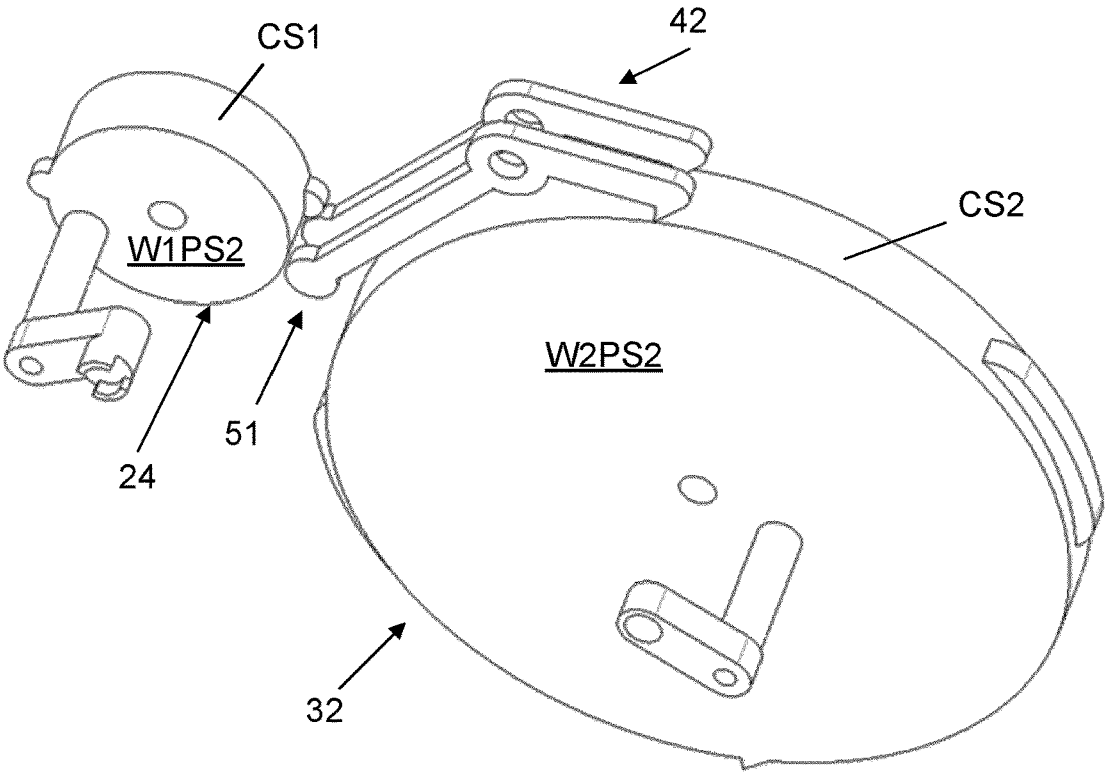
FIG. 5 shows a perspective view of the second side of the drive arrangement without the spring.

FIG. 2-5 show a first embodiment of such a drive arrangement, where FIG. 2 shows a plan view of a first side of the drive arrangement, FIG. 3 shows a plan view of a second side of the drive arrangement, FIG. 4 shows a perspective view of the first side of the drive arrangement and FIG. 5 shows a perspective view of the second side of the drive arrangement.

As can be seen in the figures the drive arrangement 23 comprises a first rotatable wheel 24 having a first and a second actuating element 26 and 28, a second rotatable wheel 32 having a first and a second locking element 34 and 36, a first movable latch 42 having a first and a second end 44 and 46 and a second movable latch 51 having a first and a second end 52 and 54. The first actuating element 26 of the first rotatable wheel 24 is provided for engagement with the first end 44 of the first movable latch 42 and the second actuating element 28 of the first wheel 24 is provided for engagement with the first end 52 of the second movable latch 51, the first locking element 34 of the second rotatable wheel 32 is provided for engagement with the second end 46 of the first movable latch 42, while the second locking element 36 of the second rotatable wheel 32 is provided for engagement with the second end 54 of the second movable latch 51.

The first wheel 24 has a center providing a first axis of rotation A1. Moreover, the first wheel 24 has a first planar surface W1PS1 with a circular shape and a second planar surface W1PS2 with a circular shape, where the first planar surface W1PS1 is provided in a first plane perpendicular to the first axis A1 and the second planar surface W1PS2 is provided in a second plane perpendicular to the first axis A1. The first and second planar surfaces W1PS1 and W1PS2 are thereby parallel to each other. They are moreover separated from each other a first length l1 along the first axis A1. The first and second planar surfaces are joined to each other by a first curved surface CS1. The perimeter of the first planar surface W1PS1 is thereby joined to the perimeter of the second planar surface W1PS2 by the first curved surface CS1, which first curved surface is a curved surface provided at a fixed radial distance from the first axis. The radius thereby defines the curvature of the first curved surface CS1. The first curved surface CS1 has a height along the first axis that is the first length l1. Thereby the first curved surface CS1 is shaped as a cylinder surface. The first curved surface CS1 has a first half of the height l1/2 adjacent the first planar surface W1PS1 and a second half of the height l1/2 adjacent the second planar surface W1PS2.

In a similar manner the second wheel 32 has a center providing a second axis of rotation A2. Moreover, the second wheel 32 also has a first planar surface W2PS1 with a circular shape and a second planar surface W2PS2 with a circular shape, where the first planar surface W2PS1 is provided in the previously described first plane and the second planar surface W2PS2 is provided in the previously described second plane. Moreover, the first and second planes are also perpendicular to the second axis A2. The first and second axes A1 and A2 are thereby also parallel. They may thereby also be interconnected by a neutral line Ln. The first and second planar surfaces W2PS1 and W2PS2 of the second wheel 32 are also parallel with each other. They are additionally separated from each other a second l2 along the second axis A2. The first and second planar surfaces W2PS1 and W2PS2 are joined to each other by a second curved surface CS2. The perimeter of the first planar surface W2PS1 is thereby joined to the perimeter of the second planar surface W2PS2 by the second curved surface CS2, which second curved surface CS2 is a curved surface provided at a fixed radial distance from the second axis A2 and having a height along the second axis A2 that is the second length l2. The second curved surface CS2 is thereby also shaped as a cylinder. The second curved surface has a first half of the height l2/2 adjacent the first planar surface W2PS1 and a second half of the height l2/2 adjacent the second planar surface W2PS2. Moreover, the first and second lengths l1 and l2 are equal and thereby the first and second wheels 24 and 32 and more particularly the first and second curved surfaces CS1 and CS2 of the first and second wheels 24 and 32 are aligned with each other. The first half of the first curved surface CS1 of the first wheel 24 is thus aligned with the first half of the second curved surface CS2 of the second wheel 32, while the second half of the first curved surface CS1 of the first wheel 24 is aligned with the second half of the second curved surface CS2 of the second wheel 32. However, as can be seen in the figures the radii differ from each other. The first wheel 24 has a smaller radius than the second wheel 32. It is thereby also smaller than the second wheel 32.

The first and second latches 42 and 51 have the same structure. The first latch 42 is pivotable around a tap point or third axis A3 through a center area 48 of the first latch 42 located between the first and second ends 44 and 46. The second latch 51 is likewise pivotable around the same tap point A3 through a center area of the second latch located between the first and second ends 52 and 54. Moreover, the latches 42 and 51 are thereby pivotable elements.

Thereby each latch comprises a first and second arm, preferably formed as straight bars, stretching out from the center area. The first and second latch 42 and 51 each has an extension along the third axis A3 that is below l1/2 or l2/2. Moreover, the first latch 42 is also aligned with the first halves of the first and second curved surfaces CS1 and CS2 of the first and second wheels 24 and 32 in order to be contained within an area covered by firsts halves of the curved surfaces. In a similar manner the second latch 51 is aligned with the second halves of the first and second curved surfaces CS1 and Cs2 of the first and second wheels 24 and 32 in order to be contained within an area covered by second halves of the curved surfaces. The first end 44 of the first latch 42 is a first distal end of the first arm that is placed to abut or lie against the first half of the first curved surface CS1, while the second end 46 is a second distal end of the second arm that is placed to abut or lie against the first half of the second curved surface CS2 of the second wheel 32. In a similar manner the first end 52 of the second latch 51 is a first distal end of the first arm placed to abut or lie against the second half of the first curved surface CS1, while the second end 54 of the second latch 51 is a second distal end of the second arm configured to abut or lie against the second half of the second curved surface CS2.

The first actuating element 26 of the first wheel 24 is provided in the first half of the first curved surface CS1 and the second actuating element 28 is provided on the second half of the first curved surface CS1. The first locking element 34 of the second wheel 32 is provided on the first half of the second curved surface CS2 and the second locking element 36 of the second wheel 32 is placed on the second half of the second curved surface CS2. Moreover, the first and second actuating elements 26 and 28 may be set to cooperate with or move the first ends 44 and 52 of the first and second latches 42 and 51 in order to move the first and second latch 42 and 51 around the third axis A3. The first actuating element 26 may thus be provided for engaging the first end 44 of the first movable latch 42 and the second actuating element 28 may be provided for engaging the first end 52 of the second movable latch 51.

The first and second actuating elements 26 and 28 may for this reason be shaped as protrusions on the first curved surface CS1, for instance as half-cylinder-shaped protrusions, sometimes referred to as nocks. The first ends 44 and 52 of the first and second latches 42 and 51 may also be formed as protrusions on the first arms of the latches, for instance as cylinder-shaped protrusions. Thereby each actuation element is realized as a protrusion, for instance a curved protrusion, on the corresponding curved surface set to cooperate with a curved surface of the first end of a corresponding latch.

The first and second locking element 34 and 36 on the second wheel 32 may be set to cooperate with the second ends 46 and 54 of the first and second latches 42 and 51. The first locking element 34 may thereby be provided for engaging with the second end 46 of the first movable latch 42 and the second locking element for engaging with the second end 54 of the second moveable latch 51. A locking element may be a stop lug. It may more particularly be formed as a protrusion interacting with a protrusion of the second end of the corresponding latch. In order to achieve this engaging between a locking element and a second end of a latch, it is possible that the locking element comprises a surface, such as a planar surface, that stretches out as a normal from a point on the second curved surface CS2, while the second end of the latch may be shaped with a surface that stretches out at an angle, such as ninety degrees, from a bar shaped second arm so that the surfaces meet and engage if the second wheel 32 is turned. Thereby the second end of a latch is equipped with a planar surface configured to engage a planar surface of the locking element.

It can thereby be seen that the first actuating element 26 is provided on the first curved surface CS of the first wheel 24 and is aligned, in a direction along the first axis A1, with the first end 44 of the first latch 42, while the first locking element 34 is provided on the second curved surface CS2 of the second wheel 32 and aligned, in a direction along the second axis A2, with the second end 46 of the first latch 42. The second actuating element 28 and second locking element 36 have the same relationships to the second latch 51.

The first and second latch 42 and 51 may also be pivotable around the third axis A3, which is thus shared. They may additionally be individually and independently pivotable around the third axis A3.

As can be seen in FIG. 1 there is also a first spring 50, which first spring 50 is connected between the first and second wheels 24 and 32 for storing energy caused by the movement of the first wheel 24 and apply this energy in the movement of the second wheel 32. For this reason, the spring 50 is connected between a first connection point CP1 on the first wheel 24 and a second connection point CP2 on the second wheel, which first connection point CP1 is radially distanced from the first axis A1 and which second connection point CP2 is radially distanced from the second axis A2. The first connection point CP1 is furthermore placed on the first planar surface W1PS1 of the first wheel 24 perpendicular to the first axis A1 and the second connection point CP2 is placed on the first planar surface W2PS1 of the second wheel 32, where the first planar surface W1PS1 of the first wheel 24 is perpendicular to the first axis A1 and the first planar surface W2PS1 of the second wheel is perpendicular to the second axis A2, where both planar surfaces W1PS1 and W2PS1 are aligned with each other, i.e. placed in the same plane.

The first and second actuating element 26 and 28 may be separated by a first angle in relation to the first axis A1. The angle may be 180 degrees. Thereby the first and second actuating elements may be separated by 180 degrees from each other around the first axis A1. The first and second locking elements 34 and 36 may be separated by a second angle in relation to the second axis A2. The angle may be 180 degrees. Thereby the first and second locking elements may be separated by 180 degrees from each other around the second axis A2.

The second wheel 32 also comprises a first and a second cam protrusion 38 and 39 on the second curved surface CS2 as well as a cam track or groove 40 in the first planar surface W2PS1. These cams are used to move one or more auxiliary switches of the tap changer. The number of cams and their realizations are merely examples.

The operation of the drive arrangement will now be further described with reference being made to FIG. 6-10, which show plan views of the first side of a variation of the drive arrangement. In this variation of the drive arrangement there are two springs, where the first spring 50 connected between the two wheels 24 and 32 is a driving spring. In the drawings the cam groove 40 of the second wheel 32 is used to change between a first and a second position PO1 and PO2 of an auxiliary switch AS. The latches are also merely schematically indicated.

The first wheel 24 is a wheel being driven by a drive shaft for instance through being operated by a motor. It is thereby also a drive shaft wheel. This drive shaft also operates a diverter switch.

The second wheel 32 is in turn a flywheel which is initially in an initial position in which a locking element is engaged with the second end of a corresponding latch. In this example it is the first locking element 34 that is engaged with the second end 46 of the first latch 42. Through this engaging, the second wheel 32 is stopped from being rotated in a first direction, which in FIG. 1 is shown as a counter-clockwise direction. The second end 46 of the first movable latch 42 is thereby engaged with the first locking element 34 of the second rotatable wheel 32 for stopping rotation of this wheel 32.

Moreover, the first wheel 24 may also, before it is being rotated, be in a first position in which the first actuating element 26 is located 145-170 degrees and with advantage 165 degrees from the neutral line Ln between the two axes A1 and A2.

Figure 7:
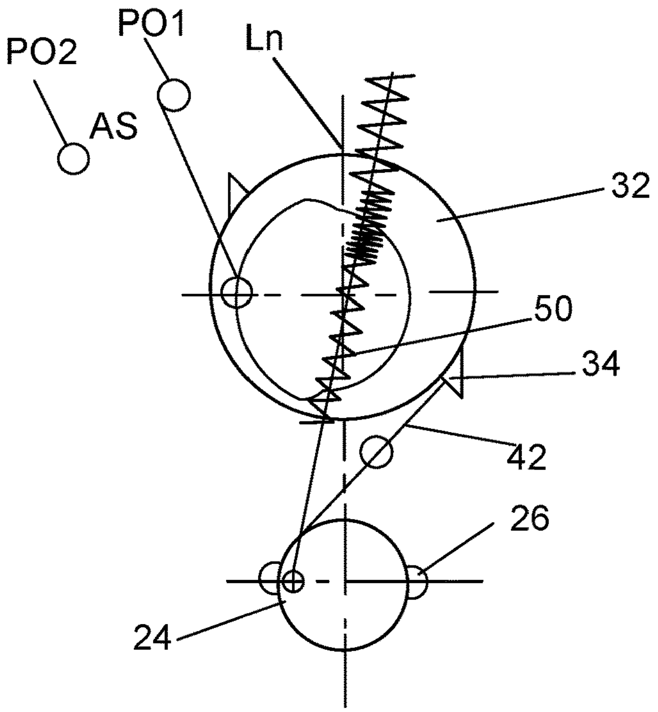
FIG. 7 shows a plan view of the first side of the drive arrangement variation when the first wheel is rotated leading to a tensioning of the spring.

The first wheel 24 is then driven around the first axis A1. However, because of the engagement between the first locking element 34 and the second end 46 of the first latch 42, the second wheel 32 does not move. Thereby the movement causes energy to be stored in the spring 50, which in FIG. 7 is shown as the active spring 50 being compressed. Through the rotation, the first actuating element 26 will eventually reach the first end 44 of the first latch 42. It will then engage with this first end 44 of the first latch 42, which first end 44 abuts the first curved surface CS. The first actuating element 26 will then actuate the first latch 42 through the first actuating element 26 acting on the first end 44 of the first latch 42. This actuating will make the first end 44 of the first latch 42 to move in a direction towards the second wheel 32. The actuating also thereby makes the first latch 42 pivot about the third axis A3, which will disengage the second end 46 of the first latch 42 from the first locking element 34 of the second rotatable wheel 32. Thereby the second end 46 of the first latch 42 is moved away from the first locking element 34 of the second wheel 32, thereby releasing the engagement between these two elements. The energy that has been stored in the spring 50 is then released and this released energy causes the second wheel 32 to rotate round the second axis A2. The energy stored in the spring 50 thereby powers the rotation of the second wheel 32.

As this is done the first wheel 24 is rotated so that the rotation is half a turn. The rotation is thus stopped at a second position of the first wheel which is 180 degrees separated from the first position.

The second wheel 32 is in this way rotated by the force of the spring 50 until the second end 54 of the second latch 51 engages with the second locking element 36 of the second wheel 32, which thus also makes the second wheel 32 stop rotating. The second locking element 36 of the second wheel 32 thus engages with the second end 54 of the second latch 51 through the movement of the second wheel 32, thereby locking the second wheel 32 in a second position that is 180 degrees displaced from the original position of the second wheel 32.

The above-mentioned operation may thereafter be repeated with respect to the second latch 51 and the second actuating element 28 until the second wheel is again locked in its initial position. The rotation of the first wheel 24 is bidirectional, i.e. it may be moved both clockwise and counter-clockwise. However, the movement of the second wheel 32 is unidirectional, which in FIG. 1 is shown as a counter-clockwise movement.

Figure 6:
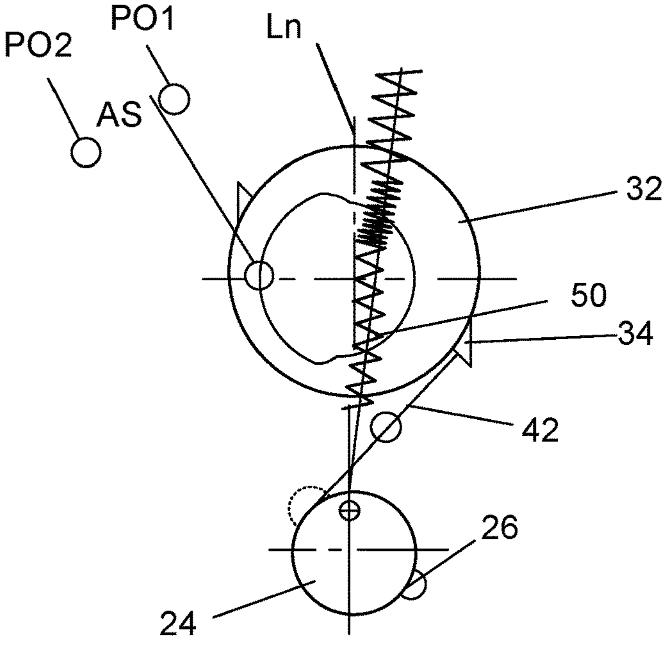
FIG. 6 shows a plan view of the first side of a variation of the drive arrangement in an initial position.

The operation may also be described in the following way:

Initially, the auxiliary contact AS is in position PO1, the springs are in a neutral position and the second wheel 32 is blocked by the first latch 42. (FIG. 6)

Operation is then started. The shaft associated with the selector starts to rotate the first wheel 24, where the shaft can rotate in both directions depending of the selector (lower or rise). Rotation of the first wheel 24 leads to the driving spring 50 being compressed. (FIG. 7)

Figure 8:
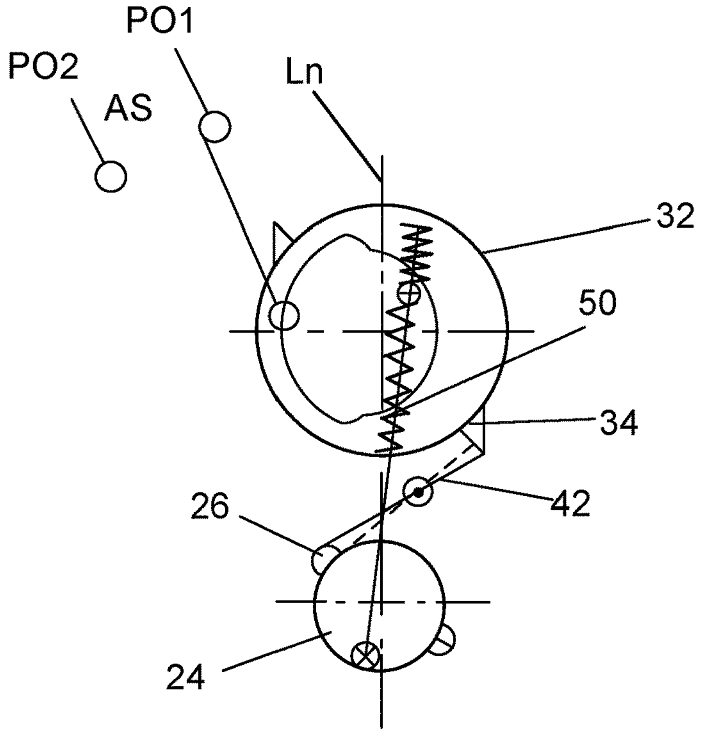
FIG. 8 shows the actuation of a first actuating element of the first wheel on a first end of a first latch in order to detach a first locking element on the second wheel from a second end of the first latch.

When the shaft has rotated the first wheel approximately 1650 the first latch 42 is released by the first actuating element 26 on the first wheel 24 acting on the first end 44 of the first latch 42. The second wheel 32 rotates 180°. During operation of the selector switch (not illustrated) and auxiliary contact AS also moves from PO1 to PO2. The second wheel 32 stops by the second end 54 of the second latch 51 engaging with the second locking element 36, in the second wheel 32. The stop position is always some more degrees more than neutral line Ln between the first and second wheels 24 and 32. This angle secures that the second wheel 32 always rotates in one direction. (FIG. 8).

Figure 9:
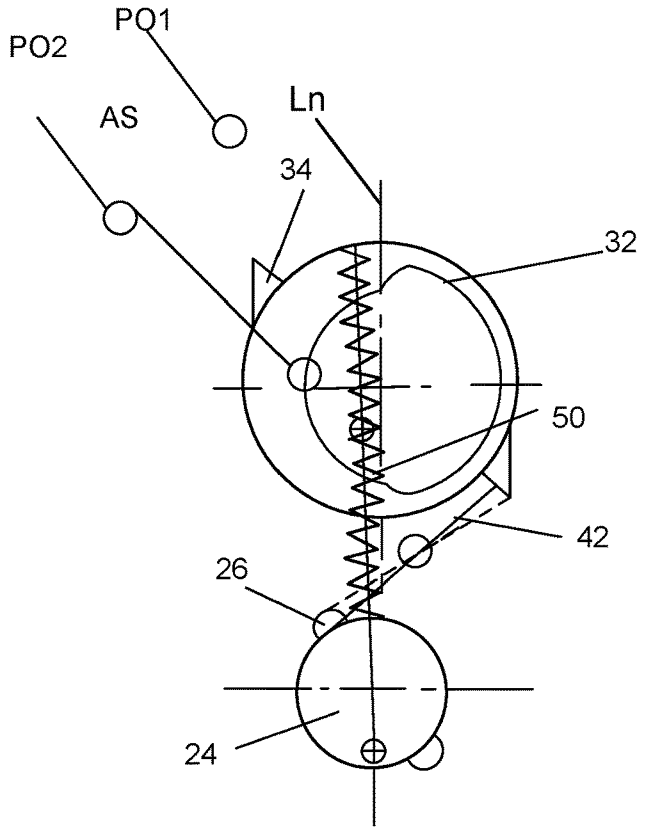
FIG. 9 shows the rotation of the second wheel due to the release of the energy in the spring until a second locking element on the second wheel engages with a second end of the second latch.

The diverter switch has now occupied a second position (not shown. Springs are in neutral position (FIG. 9).

Figure 10:
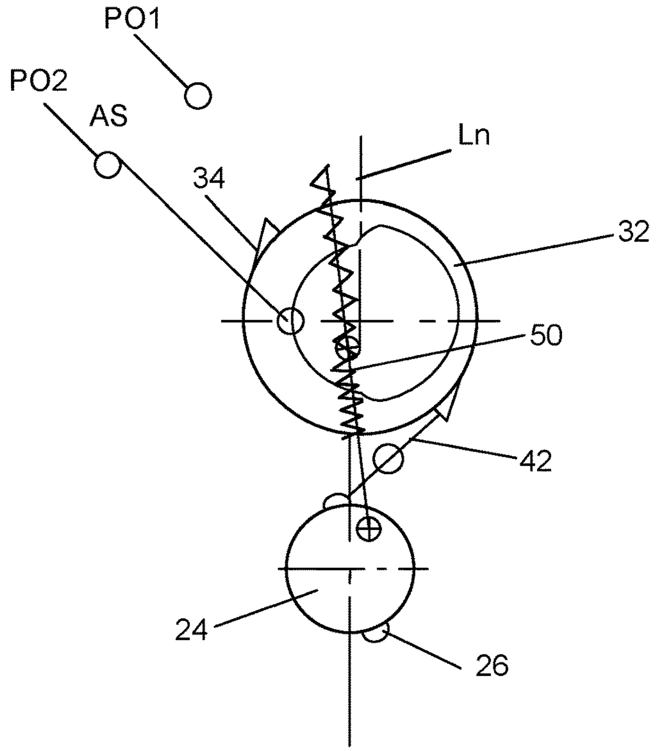
FIG. 10 shows the tensioning of the spring upon further rotation of the first wheel.

Next operation. Shaft starts to rotate the first wheel 24 in one direction, the spring 50 is compressed. When the first wheel is rotated approximate 165° the second end 54 of the second latch 51 engaged with the second locking element 36 of the second wheel 32 is releasing, and the second wheel 32 rotates 180° (FIG. 10).

Diverter switch is back in first position (FIG. 6).

Embodiments disclosed herein have a number of advantages:

It provides a simple diverter switch design.

It reduces the complexity of the design and integrates several functions with a limited number of parts.

It allows the obtaining of the same diverter switch sequence independently of the selector rotation.

The 180° rotation enables the provision of one cam track that moves the auxiliary contacts between the two positions.

The invention claimed is:

1. A drive arrangement for a tap changer, said drive arrangement comprising a first movable latch having a first and a second end, a first rotatable wheel with a first actuating element for engaging the first end of the first movable latch, a second rotatable wheel with a first locking element for engaging the second end of the first movable latch, and a first spring connected between the first and second wheels for storing energy caused by the movement of the first wheel around a first axis and apply it in the movement of the second wheel around a second axis, wherein the first actuating element is provided on a first curved surface of the first wheel and aligned with the first end of the first latch, while the first locking element is provided on a second curved surface of the second wheel and aligned with the second end of the first latch, the drive arrangement further comprising a second movable latch having a first and a second end, the first rotatable wheel having a second actuating element for engaging with the first end of the second movable latch, the second rotatable wheel having a second locking element for engaging with the second end of the second movable latch, and wherein the first actuating element is provided on a first half of the first curved surface of the first wheel, the first locking element is provided on a first half of the second curved surface of the second wheel, the second actuating element is provided on a second half of the first curved surface of the first wheel aligned with the first end of the second latch and the second locking element of the second rotating wheel is provided on a second half of the second curved surface of the second wheel aligned with the second end of the second latch.

2. The drive arrangement according to claim 1, wherein the spring is connected between a first connection point on the first wheel radially distanced from the first axis and a second connection point on the second wheel radially distanced from the second axis.

3. The drive arrangement according to claim 1, wherein the first latch is pivotable around a tap point placed in a center area of the first latch located between the first and second ends.

4. The drive arrangement according to claim 1, wherein in one initial position of the second wheel the second end of the first movable latch is engaged with the first locking element of the second rotatable wheel for stopping rotation thereof and the first rotatable wheel being driven around the first axis causing energy to be stored in the spring and subsequently causing the first actuating element to engage with the first end of the first latch for disengaging the second end of the first latch from the first locking element of the second rotatable wheel thereby causing the second wheel to rotate round the second axis powered by the release of the energy of the spring.

5. The drive arrangement according to claim 4, wherein the second locking element of the second wheel is configured to engage with the second end of the second latch through the movement of the second wheel thereby locking the second wheel in a further position.

6. The drive arrangement according to claim 1, wherein the first and second actuating elements are separated by a first angle in relation to the first axis.

7. The drive arrangement according to claim 1, wherein the first and second locking elements are separated by a second angle in relation to the second axis.

8. The drive arrangement according to claim 1, wherein the rotation of the first wheel is bidirectional.

9. The drive arrangement according to claim 1, wherein the rotation of the second wheel is unidirectional.

10. The drive arrangement according to claim 1, wherein the first wheel is connected to a diverter switch of the tap changer and the second wheel is connected to at least one further switch of the tap changer.

11. A method for operating a drive arrangement according to claim 1 comprising: driving the first rotatable wheel around the first axis when the second end of the first movable latch is engaged with the first locking element of the second rotatable wheel for stopping rotation thereof, thereby causing energy to be stored in the spring and subsequently engaging the first actuating element with the first end of the first latch for moving the first latch, thereby disengaging the second end of the first latch from the first locking element of the second rotatable wheel and rotating the second wheel powered by the release of the energy of the spring.

12. The method according to claim 11, further comprising engaging the second locking element of the second wheel with the second end of the second latch through the movement of the second wheel thereby locking the second wheel in a second position.

13. The drive arrangement according to claim 6, wherein the first angle is 180 degrees.

14. The drive arrangement according to claim 7, wherein the second angle is 180 degrees.

15. A tap charger comprising:

a diverter switch; and a drive arrangement comprising:

a first movable latch having a first and a second end;

a first rotatable wheel connected to the diverter switch, the first rotatable wheel having a first actuating element configured to engage the first end of the first movable latch;

a second rotatable wheel with a first locking element configured to engage the second end of the first movable latch;

a first spring connected between the first and second wheels configured to store energy caused by the movement of the first wheel around a first axis and apply it in the movement of the second wheel around a second axis; and a second movable latch having a first and a second end, the first actuating element provided on a first curved surface of the first wheel and aligned with the first end of the first latch, the first locking element provided on a second curved surface of the second wheel and aligned with the second end of the first latch, the first rotatable wheel having a second actuating element configured to engage with the first end of the second movable latch, the second rotatable wheel having a second locking element configured to engage with the second end of the second movable latch, the first actuating element provided on a first half of the first curved surface of the first wheel, the first locking element provided on a first half of the second curved surface of the second wheel, the second actuating element provided on a second half of the first curved surface of the first wheel aligned with the first end of the second latch, and the second locking element of the second rotating wheel provided on a second half of the second curved surface of the second wheel aligned with the second end of the second latch.

16. The tap charger according to claim 15, wherein the spring is connected between a first connection point on the first wheel radially distanced from the first axis and a second connection point on the second wheel radially distanced from the second axis.

17. The tap charger according to claim 15, wherein the first latch is pivotable around a tap point placed in a center area of the first latch located between the first and second ends.

18. The tap charger according to claim 15, wherein in one initial position of the second wheel the second end of the first movable latch is engaged with the first locking element of the second rotatable wheel for stopping rotation thereof and the first rotatable wheel being driven around the first axis causing energy to be stored in the spring and subsequently causing the first actuating element to engage with the first end of the first latch for disengaging the second end of the first latch from the first locking element of the second rotatable wheel thereby causing the second wheel to rotate round the second axis powered by the release of the energy of the spring.

19. The tap charger according to claim 18, wherein the second locking element of the second wheel is configured to engage with the second end of the second latch through the movement of the second wheel thereby locking the second wheel in a further position.

20. The tap charger according to claim 15, wherein the first and second actuating elements are separated by a first angle in relation to the first axis, and wherein the first and second locking elements are separated by a second angle in relation to the second axis.

* * * * *